(No Model.)
J. W. HENDERSON.
ELECTRICALLY PROPELLED VEHICLE.
No. 432,237. Patented July 15, 1890.
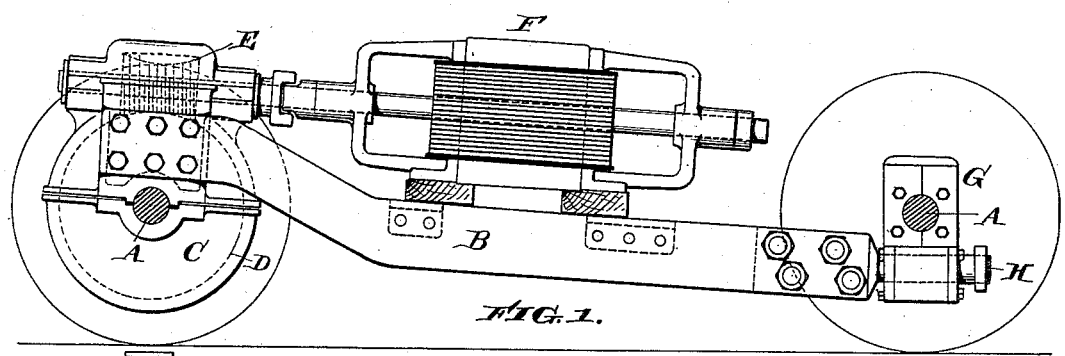
Fig. 1.
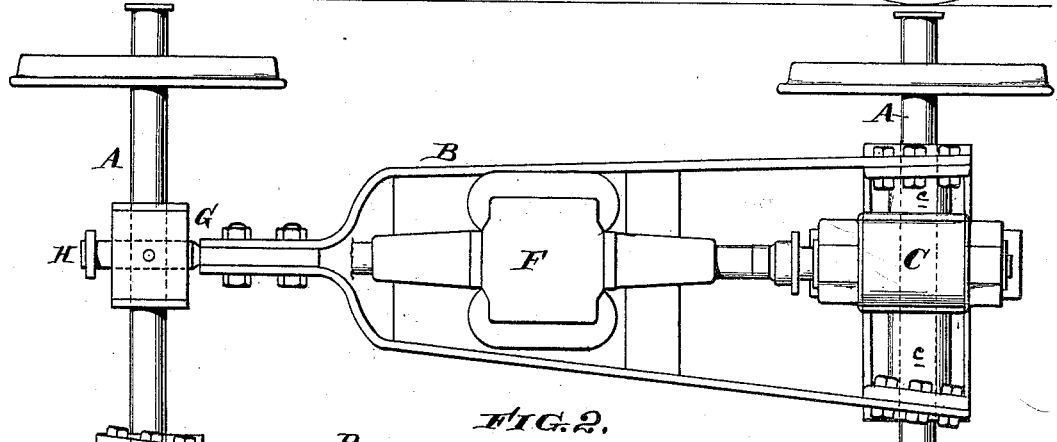
Fig. 2.
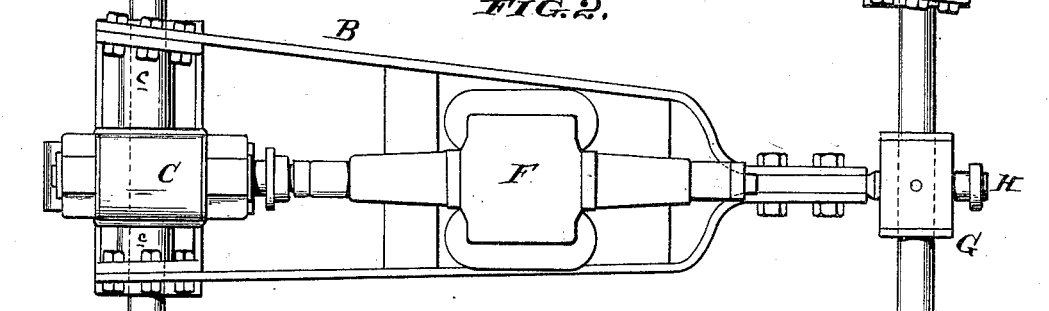
Fig. 3.   Fig. 4.
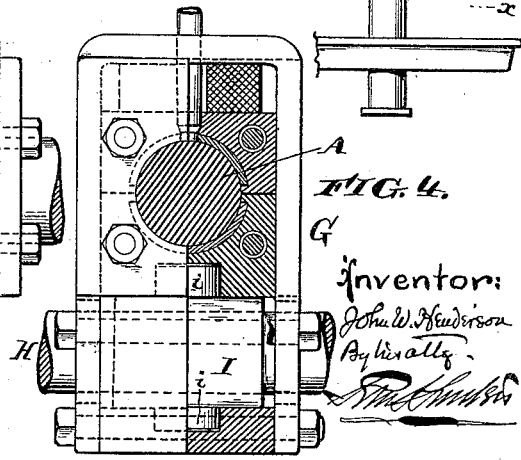
Witnesses:
Henry Drury
Maurice H. Holmes
Inventor:
John W. Henderson
By his atty

UNITED STATES PATENT OFFICE.

JOHN W. HENDERSON, OF PHILADELPHIA, PENNSYLVANIA, ASSIGNOR TO THE ELECTRIC CAR COMPANY OF AMERICA, OF PENNSYLVANIA.

ELECTRICALLY-PROPELLED VEHICLE.

SPECIFICATION forming part of Letters Patent No. 432,237, dated July 15, 1890.

Application filed March 26, 1890. Serial No. 345,301. (No model.)

*To all whom it may concern:*

Be it known that I, JOHN W. HENDERSON, of Philadelphia, in the county of Philadelphia and State of Pennsylvania, have invented an Improvement in Electrically-Propelled Vehicles, of which the following is a specification.

My invention has reference to electrically-propelled vehicles; and it consists of certain improvements, all of which are fully set forth in the following specification, and shown in the accompanying drawings, which form a part thereof.

The object of my invention is to construct an electrically-propelled vehicle in such a manner that the motors may be supported upon the axles independently of the car-body, and each of the axles be free to move in every conceivable direction with the least binding upon the frame which supports the motor.

In the drawings, Figure 1 is a sectional elevation on line $x\ x$ of Fig. 2, showing my improved electrically-propelled vehicle. Fig. 2 is a plan view of the same; and Figs. 3 and 4 are detailed views, with part in section, of portions which more particularly relate to my improvements.

A are the axles, and B is a motor-frame, which extends from one axle to the other. Upon one of the axles is a frame C, having extended bearings $c$, and to this frame C is bolted one end of the frame B. The other end of the frame B is provided with a pin H, which extends through a bearing G, carried upon the other axle, so as to have a universal joint therewith.

F is the electric motor, carried upon the frame B, and has its shaft provided with a worm E, meshing with the worm-wheel D, said parts being shown in dotted lines and inclosed within the framing C.

The bearing G is loosely supported upon the axle A, and is free to slide longitudinally thereon, with provision for rotating about said axle as an axis. Said bearing G carries a block I, pivoted on vertical axes $i$, so as to rotate horizontally, and through this block I the pin H extends, with freedom to longitudinal movement as well as rotary movement. The pin is preferably arranged below the axle; but it is evident that, if desired, the bearing G might be turned upside down and the pin H arranged above the axle. It is more desirable, however, to arrange it as shown, and it is so arranged in practice. The bearing G is made with an enlarged aperture $g$, where the pin H extends through the block I, as shown in Fig. 3, so as to allow lateral movement about the vertical axes without binding upon the bearing. It will thus be seen that with the construction here shown the axles might be moved toward or from each other or twisted about a longitudinal axis, or have their ends upon one side of the car moved toward each other or from each other, or shift their positions laterally, without in the least binding upon the frame or journals, thereby enabling the car to be propelled at all times with a minimum expenditure of power.

My improvement is particularly advantageous in roads where there are many crossings, switches, frogs, &c.

The details of construction may be modified without departing from the spirit of the invention.

Having now described my invention, what I claim as new, and desire to secure by Letters Patent, is—

1. In an electrically-propelled vehicle, the combination of the two axles, a frame journaled upon one of the axles and connected to the other axle by a bearing having freedom of movement about a vertical axis, and an electric motor supported upon said frame and gearing with the axle to which said frame is journaled.

2. In an electrically-propelled vehicle, the combination of the two axles, a frame journaled upon one of the axles by an extended bearing, a bearing journaled upon the other axle and carrying a block pivoted on a vertical axis, a pin carried by the frame journaled in said block with provision for rotary motion about a longitudinal axis, and an electric motor carried by said frame and geared to the axle to which the frame is journaled.

3. In an electrically-propelled vehicle, the combination of the two axles, a frame journaled upon one of the axles by an extended bearing, a bearing journaled upon the other axle with freedom of longitudinal motion upon